United States Patent [19]

Amano et al.

[11] Patent Number: 4,972,012

[45] Date of Patent: Nov. 20, 1990

[54] POLYVINYL CHLORIDE RESIN COMPOSITION

[75] Inventors: Tadashi Amano, Ibaraki; Hajime Kitamura, Chiba, both of Japan

[73] Assignee: Shin-Etsu Chemical Co., Ltd., Tokyo, Japan

[21] Appl. No.: 406,967

[22] Filed: Sep. 13, 1989

Related U.S. Application Data

[63] Continuation-in-part of Ser. No. 353,325, May 15, 1989, abandoned, which is a continuation-in-part of Ser. No. 162,708, Mar. 1, 1988, abandoned.

[30] Foreign Application Priority Data

Mar. 12, 1987 [JP] Japan ................................. 62-57288
Mar. 12, 1987 [JP] Japan ................................. 62-57289

[51] Int. Cl.$^5$ ........................... C08K 5/36; C08K 5/37; C08L 29/04; C08L 27/06
[52] U.S. Cl. .................... 524/180; 524/178; 525/57; 525/59
[58] Field of Search ................ 525/57, 59; 524/567, 524/180

[56] References Cited

U.S. PATENT DOCUMENTS 2,914,506  11/1959  Mack et al. ...................... 524/180
4,258,163  3/1981   Mariasi et al. ..................... 525/61

FOREIGN PATENT DOCUMENTS 3001517     7/1981  Fed. Rep. of Germany ........ 525/59
3048687     7/1982  Fed. Rep. of Germany ........ 525/59
61-195101A  8/1986  Japan ................................. 525/59
420638      8/1974  U.S.S.R. ............................. 525/57
626103      9/1978  U.S.S.R. ............................. 525/57
904912      9/1962  United Kingdom ................. 525/57

Primary Examiner—Carman J. Seccuro
Attorney, Agent, or Firm—Wenderoth, Lind & Ponack

[57] ABSTRACT

The polyvinyl chloride (PVC) resin-based composition of the invention gives a molded article which suffers little from the disadvantageous phenomenon of surface whitening as is sometimes unavoidable when a conventional PVC resin-made article is prolongedly kept under adverse conditions as in hot water or in a high-temperature, high-humidity atmosphere. The composition characteristically comprises a limited amount of a partially saponified polyvinyl alcohol having an average degree of polymerization of 150 to 600 and a degree of saponification of 20 to 55% as a special additive in an amount of 0.8 to 5.0% by weight based on the PVC resin. The resin composition is also less subject to the disadvantage of a decrease in the transparency of the resin articles even when the resin composition is compounded with a metal-containing heat stabilizer such as organotin mercaptides.

2 Claims, No Drawings

POLYVINYL CHLORIDE RESIN COMPOSITION

BACKGROUND OF THE INVENTION

This application is a continuation-in-part application from a copending U.S. patent application Ser. No. 07/353,325 filed May 15, 1989, now abandoned, which is a continuation-in-part application from a U.S. patent application Ser. No. 07/162,708 filed Mar. 1, 1988, now abandoned.

The present invention relates to an improved polyvinyl chloride resin composition or, more particularly, to a polyvinyl chloride resin composition capable of being molded into a shaped article having good transparency and little suffering from the disadvantageous denaturation of whitening by aging or in the lapse of time even in prolonged contact with water, alcohol or an aqueous alcohol.

Polyvinyl chloride resins and vinyl chloride-based copolymers, hereinafter referred to generally as a PVC resin, are widely used in a variety of applications because these PVC resins give shaped articles having excellent mechanical properties such as resistance against chemicals, weatherability and transparency and the rigidity or flexibility of the shaped articles can be freely controlled by appropriately selecting the amount of the plasticizer compounded with the resin. Needless to say, one of the important applications of a PVC resin is as a material for molding of various kinds of containers, e.g., bottles, plates and boards for industrial and decorative uses, films, sheets and the like of which glass-like transparency is essential. A serious problem in the PVC resin-based shaped articles having transparency is the disadvantageous phenomenon of so-called whitening which is a phenomenon that the surface of the article becomes white and cloudy to lose transparency when the article is contacted with water, alcohol or a mixture thereof as is sometimes the case when the article is used as a container or wrapping material of a water- and/or alcohol-containing material or the shaped article is prolongedly kept standing in a high-temperature and high-humidity atmosphere to cause a great decrease in the commercial value of not only the shaped article of the resin composition per se but also the material contained therein or wrapped therewith. Accordingly, it is eagerly desired to develop an improved PVC resin-based composition free from the disadvantages of whitening of the articles shaped thereof even when they are brought and kept under adverse conditions.

These PVC resins are usually compounded with a heat stabilizer in order to decrease thermal degradation taking place in the course of molding into shaped articles. Various types of heat stabilizers are known and used in the prior art, of which several lead compounds belong to an important class including tribasic lead sulfate, dibasic lead phosphite, dibasic lead phthalate and the like. A disadvantage in a PVC resin composition compounded with such a lead compound as a heat stabilizer is a decrease in the transparency of the shaped articles molded of the resin composition. Organic tin compounds, e.g., organotin maleates, laurates and mercaptides belonging to another important class of the heat stabilizers also have a similar problem.

SUMMARY OF THE INVENTION

The present invention accordingly has an object to provide an improved PVC resin-based composition capable of giving a transparent shaped article which suffers little from the disadvantageous phenomenon of whitening even under adverse conditions of contacting with water, alcohol or a water-alcohol mixture or under high-temperature and high-humidity conditions and has excellent heat stability imparted thereto by compounding a lead-or tin-bas-ed heat stabilizer without a disadvantageous decrease in the trans-parency.

Thus, the PVC resin-based composition of the present invention comprises, in admixture:

(A) 100 parts by weight of a polyvinyl chloride resin or a copolymeric resin mainly consisting of the moiety of vinyl chloride; and
(B) from 0.8 to 5 parts by weight of a partially saponified polyvinyl alcohol having an average degree of polymerization in the range from 150 to 600 and a degree of saponification in the range from 20 to 55% by moles.

DETAILED DESCRIPTION OF THE PREFERRED EMBODIMENTS

As is described above, the PVC resin-based composition of the invention characteristically contains a specific polyvinyl alcohol in a limited amount. The polyvinyl alcohol of a low degree of polymerization and low saponification degree specified above is not a novel compound in relation to PVC resins. For example, such a polyvinyl alcohol is used as an additive in the polymerization mixture for the suspension polymerization of vinyl chloride as is disclosed in Japanese Patent Kokai 52-110797, 61-195101 and elsewhere in a limited amount. The PVC resin products obtained in these prior art methods, however, have the transparency characteristics with no improvement as compared with PVC resins obtained without using such a specific polyvinyl alcohol. The amount of the polyvinyl alcohol as an additive in the polymerization mixture is limited because an increase thereof to exceed a certain limit may cause a problem of deposition of a large amount of polymer scale on the reactor walls and uncontrolled particle size distribution of the resin product. On the contrary, the inventive PVC resin composition is so highly resistant against the phenomenon of whitening that a transparent sheet molded of the composition having a thickness of 0.5 mm exhibits a haze not exceeding 10% even after the sheet has been immersed for 30 minutes in a hot water at a temperature of 80° C.

The inventive PVC resin composition is prepared by blending a PVC resin or a copolymeric resin mainly composed of the moiety of vinyl chloride as the base resin with the partially saponified polyvinyl alcohol resin uniformly in a suitable blending machine. The base resin, i.e. the component (A), may be a homopolymeric PVC resin or may be a copolymeric resin obtained by the copolymerization of a monomer mixture composed of 50% by weight or more of vinyl chloride and 50% by weight or less of one or more of other monomers copolymerizable with vinyl chloride exemplified by vinyl esters, e.g., vinyl acetate and propionate, acrylic or methacrylic acid and esters thereof, e.g., methyl and ethyl acrylates and methyl and ethyl methacrylates, olefins, e.g., ethylene and propylene, maleic anhydride, acrylonitrile, styrene, vinylidene halides, e.g., vinylidene chloride, alkyl vinyl ethers, alkyl vinyl ketones, and the like. It is optional that the base resin as the component (A) is compounded beforehand or together with the component (B) with known additives such as impact strength-improving agents, e.g., ABS and MBS resins, each in a limited amount not to unduly affect the transparency of the articles shaped from the resin composition.

The characteristic ingredient in the inventive PVC resin composition is the component (B) which is a partially saponified polyvinyl alcohol having an average degree of polymerization in the range from 150 to 600 and a degree of saponification in the range from 20 to 55% by moles. These values can be determined, for example, according to the procedures specified in JIS K 6726. The amount of the component (B) compounded with the base resin as the component (A) should usually be in the range from 0.8 to 5.0 parts by weight or, preferably, from 0.8 to 2.0 parts by weight per 100 parts by weight of the component (A). When the amount of the component (B) is too small, no satisfactory improvement can be obtained against whitening of the articles shaped from the resin composition as a matter of course. When the amount thereof is too large, on the other hand, an economical disadvantage is caused due to the increase in the cost with little further increase in the desired effect.

When the degree of saponification of the polyvinyl alcohol prepared by partially saponifying a polyvinyl acetate is lower than the above mentioned lower limit, the PVC resin compounded with such a polyvinyl alcohol would have a decreased heat stability while a PVC resin compounded with a partially saponified polyvinyl alcohol of which the degree of saponification exceeds the above mentioned upper limit is not imparted with improved resistance against whitening in contact with hot water.

The inventive PVC resin composition also contains (C) a heat stabilizer which is an organotin compound selected from the group consisting of dibutyl tin laurate compounds, e.g., dibutyl tin dilaurate, dibutyl tin maleate compounds, e.g., dibutyl tin dimaleate, dibutyl tin laurate maleate, butyl tin mercaptide compounds, e.g., dibutyl tin mercaptide and monobutyl tin mercaptide, di-n-octyl tin maleate polymers, dioctyl tin maleate compounds, dioctyl tin laurate compounds, octyl tin mercaptide compounds and the like. These organotin compounds can be used either singly or as a combination of two kinds or more according to need. The amount of these organotin compounds as a heat stabilizer in the inventive composition is in the range from 0.3 to 5 parts by weight per 100 parts by weight of the PVC resin as the component (A). In particular, organotin mercaptide compounds are preferred in respect of the high effectiveness for preventing whitening when the shaped article of the resin composition is kept in contact with hot water.

It is of course optional according to need that the inventive resin composition is further admixed with various kinds of known additives including impact strength improvers, e.g., ABS and MBS resins, lubricants, ultraviolet absorbers, antioxidants, acrylic processing aids such as polymethyl methacrylate and the like each in a limited amount not to substantially decrease the transparency of the shaped articles molded of the resin composition. The inventive resin composition is capable of giving a shaped article or a sheet having a thickness of 0.5 mm as compression-molded at 170° C. or higher temperature having a haze value of 5.0 or, sometimes, 2.0 or smaller as determined according to the procedure specified in JIS K 7105.

The inventive resin composition can be prepared by uniformly blending the above described PVC resin, partially saponified polyvinyl alcohol, heat stabilizer and other optional additives in a suitable resin blending machine such as Henschel mixers and the like. The blending order of the components is not particularly limitative. For example, the partially saponified polyvinyl alcohol can be blended with the PVC resin together with other additives at one time or can be mixed with other additives before blending with the PVC resin. The thus prepared PVC resin composition of the invention can be molded by any known molding methods including calendering, extrusion molding, injection molding, blow molding and the like to give various shaped articles having high transparency and stability.

In the following, the PVC resin composition of the present invention is described in more detail by way of examples.

EXAMPLES 1 TO 3 AND COMPARATIVE EXAMPLE.

Three PVC resin compositions, referred to as the compositions 1, 2 and 3 hereinbelow, were prepared in Examples 1, 2 and 3, respectively, each by compounding 100 parts by weight of a commercially available PVC resin (TK 700, a product by Shin-Etsu Chemical Co.) with a partially saponified polyvinyl alcohol having an average degree of polymerization of 300 and a degree of saponification of 48.2% by moles, referred to as PVA-I hereinbelow, or another partially saponified polyvinyl alcohol having an average degree of polymerization of 500 and a degree of saponification of 35.2% by moles, referred to as PVA-II hereinbelow, in an amount indicated in the table below, 6 parts by weight of dioctyl phthalate, 3.5 parts by weight of dibutyl tin mercaptide (TVS-1360, a product by Nitto Kasei Co.), each 0.5 part by weight of processing aids (P-700 and P-551, products by Mitsubishi Rayon Co.), 0.5 part by weight of stearyl alcohol and 0.5 part by weight of butyl stearate. In Comparative Example, a fourth PVC resin composition, referred to as the composition 4 hereinbelow, was prepared in the same formulation as above excepting omission of the partially saponified polyvinyl alcohol.

Each of the compositions 1 to 4 was kneaded on a hot test roller mill at 170° C. for 3 minutes and then sheeted into a sheet of 0.5 mm thickness which was further pressed at 180° C. for 6 minutes into a transparent test specimen. These test specimens were subjected to the measurements of the haze value and overall light transmission according to the procedure specified in JIS K 7105 by using a degital turbidimeter (Model NDH-20D manufactured by Nippon Denshoku Kogyo Co.) either as prepared or after immersion for 30 minutes in a hot water bath at 80° C. to give the results shown in the table below.

TABLE

| Composition No. | 1 | 2 | 3 | 4 |
|---|---|---|---|---|
| PVA (parts by weight) | I(0.8) | I(1.5) | II(1.0) | none |
| As prepared | | | | |
| Haze, % | 1.3 | 1.2 | 1.4 | 1.6 |
| Overall light transmission, % | 91.3 | 91.7 | 91.4 | 91.0 |
| After hot water immersion | | | | |
| Haze, % | 9.8 | 9.5 | 9.6 | 41.9 |
| Overall light transmission, % | 85.9 | 86.1 | 86.0 | 76.2 |

What is claimed is:

1. A polyvinyl chloride resin-based composition which comprises, in admixture:
   (A) 100 parts by weight of a polyvinyl chloride resin or a copolymeric resin mainly composed of the moiety of vinyl chloride;
   (B) from 0.8 to 5.0 parts by weight of a partially saponified polyvinyl alcohol having an average degree of polymerization in the range from 150 to 600 and a degree of saponification in the range from 20 to 55% by moles and
   (C) from 0.3 to 5.0 parts by weight of an organotin mercaptide as a heat stabilizer.

2. The polyvinyl chloride resin-based composition as claimed in claim 1 wherein the amount of the partially saponified polyvinyl alcohol as the component (B) is in the range from 0.8 to 2.0 parts by weight per 100 parts by weight of the component (A).

* * * * *